(12) United States Patent
Ching et al.

(10) Patent No.: US 12,459,655 B2
(45) Date of Patent: Nov. 4, 2025

(54) HYBRID ICE PROTECTION SYSTEM

(71) Applicant: GOODRICH CORPORATION, Charlotte, NC (US)

(72) Inventors: Nathaniel Ching, Hartville, OH (US); Sugumaran Selvaraj, Bangalore (IN); Rhushikesh Patil, Bengaluru (IN); Jin Hu, Cary, NC (US); Galdemir C. Botura, Copley, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 18/617,451

(22) Filed: Mar. 26, 2024

(65) Prior Publication Data
US 2025/0236399 A1 Jul. 24, 2025

(30) Foreign Application Priority Data
Jan. 24, 2024 (IN) .............................. 202441004930

(51) Int. Cl.
*B64D 15/12* (2006.01)
*B64D 15/16* (2006.01)

(52) U.S. Cl.
CPC ........... *B64D 15/12* (2013.01); *B64D 15/163* (2013.01)

(58) Field of Classification Search
CPC .............................. B64D 15/12; B64D 15/163
See application file for complete search history.

(56) References Cited

U.S. PATENT DOCUMENTS

| | | | |
|---|---|---|---|
| 5,921,502 A * | 7/1999 | Al-Khalil | B64D 15/163 244/134 A |
| 6,129,314 A | 10/2000 | Giamati et al. | |
| 8,430,359 B2 | 4/2013 | Al-Khalil | |
| 10,131,449 B2 | 11/2018 | Strobl et al. | |
| 10,442,540 B2 | 10/2019 | Strobl et al. | |
| 11,643,967 B2 | 5/2023 | Bourhis et al. | |
| 2012/0074262 A1 | 3/2012 | Chuc et al. | |
| 2015/0183530 A1* | 7/2015 | Strobl | B64D 15/12 156/60 |
| 2018/0192476 A1* | 7/2018 | Chaudhry | H05B 3/145 |
| 2023/0365265 A1 | 11/2023 | Bourhis et al. | |

OTHER PUBLICATIONS

European Patent Office, European Search Report dated Apr. 4, 2025 in Application No. 25153203.2.

* cited by examiner

*Primary Examiner* — Nicholas McFall
(74) *Attorney, Agent, or Firm* — SNELL & WILMER L.L.P.

(57) ABSTRACT

A hybrid deicing system is disclosed herein. The hybrid deicing system includes a first deicing system coupled to a high critical zone of a control surface, the first deicing system providing thermal energy to the high critical zone of the control surface to remove ice from the control surface, a second deicing system coupled to a low critical zone of the control surface, the second deicing system configured to vibrate the control surface to remove ice from the control surface, and a controller configured to control the first deicing system and the second deicing system.

19 Claims, 5 Drawing Sheets

HYBRID ICE PROTECTION SYSTEM

CROSS-REFERENCE TO RELATED APPLICATIONS

This application claims priority to, and the benefit of, India patent application No. 202441004930, filed Jan. 24, 2024 (DAS Code 03ED) and titled "HYBRID ICE PROTECTION SYSTEM," which is incorporated by reference herein in its entirety for all purposes.

FIELD

The present disclosure generally relates de-icing aircraft wings, and more particularly, to de-icing aircraft wings using piezoelectric devices.

BACKGROUND

Aircraft rely on the specific geometric design of the wings for providing lift and controlling the aircraft. Ice tends to build up on the wings of aircraft during the winter and while flying at high elevations. Existing aircraft de-icing systems typically rely on heat to remove and/or prevent ice build up. These systems tend to use large amounts of electricity to heat the wings of the aircraft to remove ice build up. Electro-mechanical systems exist but are complex to build and do not efficiently remove ice build up.

SUMMARY

Disclosed herein is a hybrid deicing system including a first deicing system coupled to a high critical zone of a control surface, the first deicing system providing thermal energy to the high critical zone of the control surface to remove ice from the control surface, a second deicing system coupled to a low critical zone of the control surface, the second deicing system configured to vibrate the control surface to remove ice from the control surface, and a controller configured to control the first deicing system and the second deicing system.

In various embodiments, the high critical zone is a top surface of the control surface. In various embodiments, the low critical zone is a bottom surface of the control surface. In various embodiments, the hybrid deicing system further includes a heater power control configured to provide heat to the first deicing system and a zonal piezo control configured to provide an input frequency to the second deicing system. In various embodiments, the hybrid deicing system further includes a piezo driver control configured to provide power to the zonal piezo control. In various embodiments, the second deicing system includes a plurality of piezoelectric devices. In various embodiments, the first deicing system abuts the second deicing system.

Also disclosed herein is an aircraft including a fuselage, a wing coupled to the fuselage, the wing having a top surface, a bottom surface, and a leading edge between the top surface and the bottom surface, and a hybrid deicing system coupled to the wing. The hybrid deicing system includes a first deicing system coupled to the wing and extending from the leading edge to the top surface of the wing, the first deicing system providing thermal energy to the top surface of the wing to ice from the top surface of the wing and a second deicing system coupled to the wing and extending from the leading edge to the bottom surface of the wing, the second deicing system configured to vibrate the bottom surface of the wing to remove ice from the bottom surface.

In various embodiments, the aircraft further includes a plane flap coupled to an aft side of the wing, the aft side of the wing being opposite the leading edge, and the plane flap having a bottom surface and a third deicing system coupled to the bottom surface of the plane flap, the third deicing system configured to vibrate the bottom surface of the plane flap to remove ice from the plane flap. In various embodiments, the aircraft further includes a horizontal stabilizer coupled to the fuselage, the horizontal stabilizer having a top surface and a bottom surface, a third deicing system coupled to the bottom surface of the horizontal stabilizer, the third deicing system providing thermal energy to the bottom surface of the horizontal stabilizer to ice from the bottom surface of the horizontal stabilizer, and a fourth deicing system coupled to the top surface of the horizontal stabilizer, the fourth deicing system configured to vibrate the top surface of the horizontal stabilizer to remove ice from the horizontal stabilizer.

In various embodiments, the second deicing system is configured to vibrate at a high frequency of at least 20 kHz. In various embodiments, the hybrid deicing system further includes a controller configured to control the first deicing system and the second deicing system. In various embodiments, the aircraft further includes a low ice adhesion (LIA) coating applied to an exterior portion of at least one of the top surface, the bottom surface, or the leading edge. In various embodiments, the second deicing system includes a plurality of piezoelectric devices. In various embodiments, the second deicing system includes an ultrasonic actuator.

Also disclosed herein is an aircraft including a fuselage, a wing coupled to the fuselage, the wing having a top surface, a bottom surface, and a leading edge between the top surface and the bottom surface, and a hybrid deicing system coupled to the wing. The hybrid deicing system includes a first deicing system coupled to the wing, the first deicing system providing thermal energy to the wing to remove ice from the wing and a second deicing system coupled to the wing and adjacent the first deicing system, the second deicing system configured to vibrate the wing to remove ice from the wing.

In various embodiments, the first deicing system is coupled to the top surface and the bottom surface adjacent the leading edge and the second deicing system is coupled to the top surface and the bottom surface, the first deicing system disposed between the leading edge and the second deicing system. In various embodiments, the first deicing system is coupled to the top surface of the wing and the second deicing system is coupled to the bottom surface of the wing. In various embodiments, the first deicing system abuts the second deicing system. In various embodiments, the second deicing system includes a plurality of piezoelectric devices.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
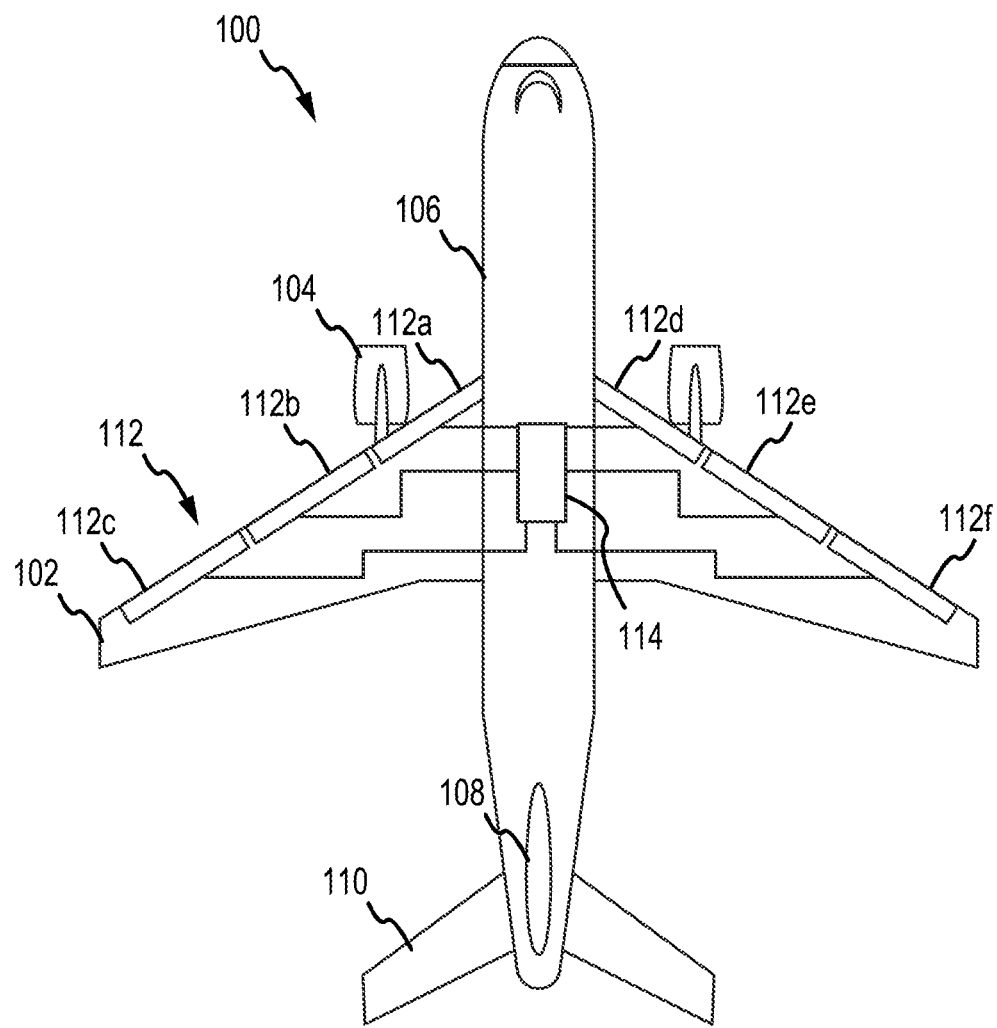
FIG. 1 illustrates an aircraft including a hybrid ice protection system on the wings, in accordance with various embodiments.

Referring now to FIG. 1, a top view of an aircraft 100 is illustrated, in accordance with various embodiments. Aircraft 100 includes wings 102, engines 104, a fuselage 106, a tail 108, and stabilizers 110, among other control surfaces. Aircraft 100 further includes a plurality of deicing assemblies 112 including deicing assemblies 112a, 112b, 112c on a first wing 102 and deicing assemblies 112d, 112e, 112f on a second wing 102. In various embodiments, deicing assemblies 112 may be located on a leading edge of each wing 102 (as illustrated in FIG. 1) to prevent the build up on ice on the leading edge of each wing 102. In various embodiments, deicing assemblies 112a, 112d may be located at a proximal end of wings 102 adjacent fuselage 106, deicing assemblies 112c, 112f may be located at a distal end of wings 102, and deicing assemblies 112b, 112e may be located between deicing assemblies 112a, 112d and deicing assemblies 112c, 112f, respectively.

In various embodiments, deicing assemblies 112 may be located on an external surface of wings 102. In various embodiments, deicing assemblies 112 may be located on an internal surface of wings 102. In various embodiments, deicing assemblies 112 may be, additionally or in the alternative, coupled to an external surface and/or an internal surface of a leading edge engines 104, fuselage 106, tail 108, stabilizers 110, and/or other control surfaces of aircraft 100. For simplicity and ease of discussion, deicing assemblies 112 will be described as being coupled to the leading edge of wings 102, though other locations are considered.

In various embodiments, each of the deicing assemblies 112a-112f may be individually coupled to a controller 114. In various embodiments, controller 114 may comprise one or more processors configured to implement various logical operations in response to execution of instructions, for example, instructions stored on a non-transitory, tangible, computer-readable medium. The one or more processors can be a general-purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof. In various embodiments, controller 114 may further comprise memory to store data, executable instructions, system program instructions, and/or controller instructions to implement the control logic of controller 114.

Figure 2A:
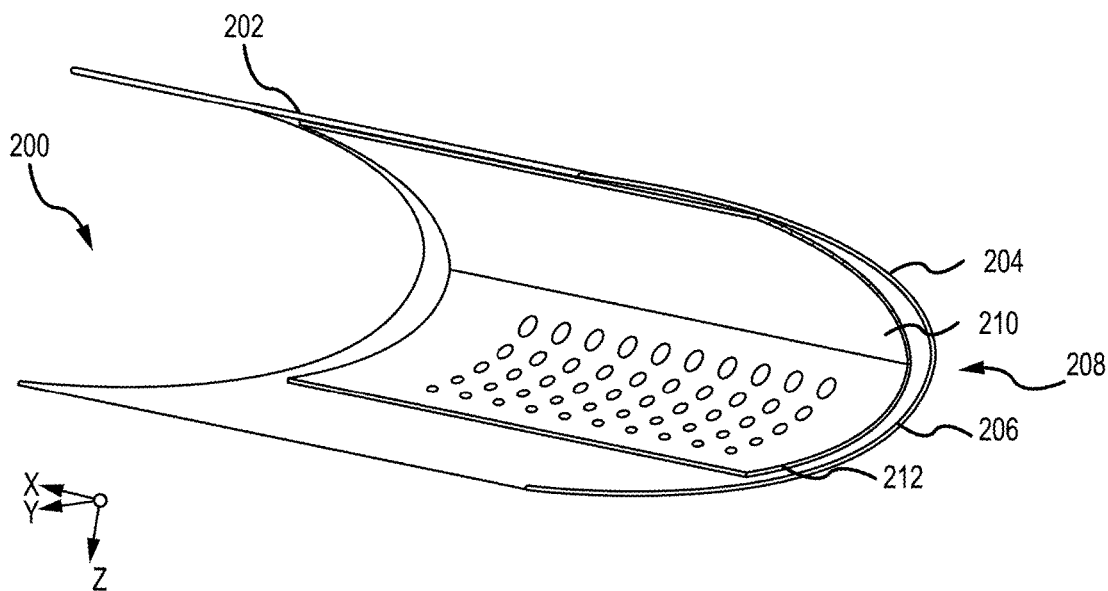
FIGS. 2A and 2B illustrate an aircraft wing with a hybrid ice protection system, in accordance with various embodiments.
Figure 2B:
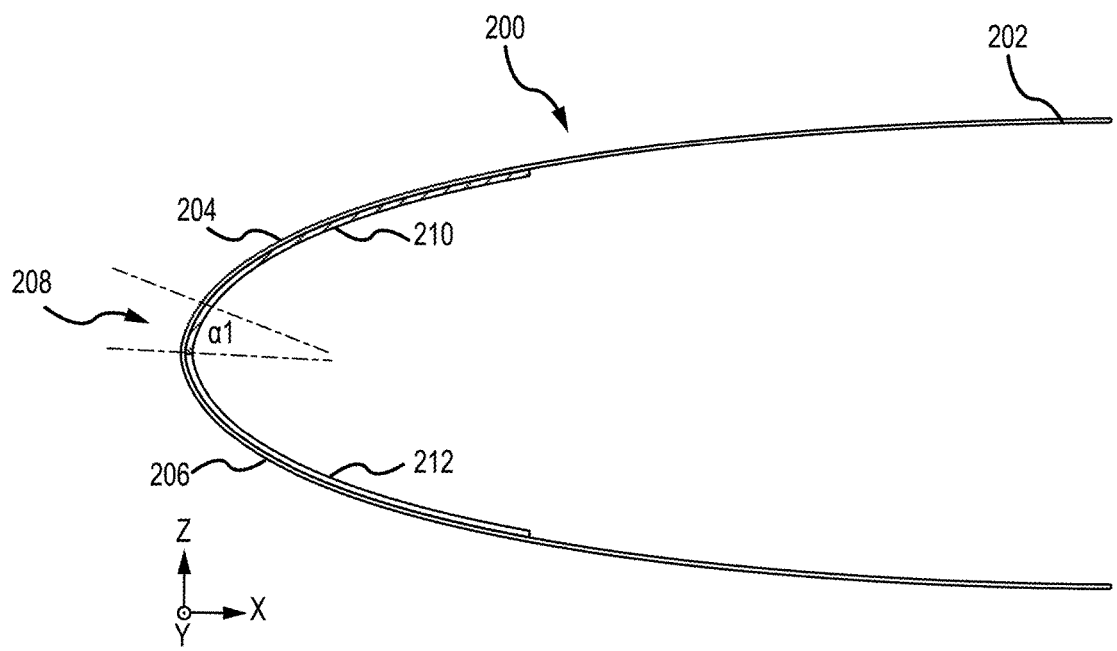

Referring now to FIGS. 2A and 2B, a hybrid deicing system 200 is illustrated for use on a control surface 202 of aircraft 100. In various embodiments, control surface 202 may be an example of wing 102 or stabilizer 110, among others. Control surface 202 has a high critical zone 204, a low critical zone 206, and a stagnation zone 208. High critical zone 204 includes surfaces, such as a top surface, or suction side, of control surface 202 (e.g., in the positive z-direction), where accumulation of ice affects the stall speed or drag of control surface 202 faster than low critical zone 206 or otherwise has a greater effect on the safety of flight of aircraft 100. Low critical zone 206 includes surfaces, such as a bottom surface, or pressure side, of control surface 202 (e.g., in the negative z-direction), where accumulation of ice has less of an effect on the flight of aircraft 100. That is, airflow over the top surface, or suction side, of control surface 202 (e.g., wing 102, stabilizer 110, etc.) is affected more by the accumulation of ice than airflow under a bottom surface, or pressure side, of control surface 202. Ice build up tends to negatively affect airflow over control surface 202, both the top surface and the bottom surface, during flight and, therefore, negatively affect flight of aircraft 100. Generally, high critical zone 204 is a first portion of control surface 202 for which ice accumulation has a greater effect on the airflow (e.g., stall speed, drag, etc.) and low critical zone 206 is a second portion of control surface 202 for which ice accumulation has less of an effect on the airflow.

Stagnation zone 208 is the zone, or point, of control surface 202 at which air flow splits between the top surface and the bottom surface, and, in various embodiments, stops. That is, there may be air in stagnation zone 208 that effectively stops or is held in placed by the split air flow. Stagnation zone 208 is defined by an angle α1 that extends from a leading edge of control surface 202 into critical zone 204 (e.g., in the positive z-direction). In various embodiments, angle α1 may be about 0° to about 30° above or below the leading edge of control surface 202. Stagnation zone 208 is a zone and angle α1 changes due to variations of the angles of attack of aircraft 100, such as during takeoff, climbing, cruising, banking, descending, and landing. Other causes for the variation in the angle of attack include fuel consumption and therefore weight loss of the aircraft. Stagnation zone 208 is generally considered to be part of high critical zone 204.

Hybrid deicing system 200 includes a first deicing system 210 protecting high critical zone 204 and a second deicing system 212 protecting low critical zone. In various embodiments, first deicing system 210 may be internal to control surface 202 and/or external to control surface 202. In various embodiments, second deicing system 212 may be internal to control surface 202 and/or external to control surface 202. In various embodiments, first deicing system 210 abuts second deicing system 212. In various embodiments, first deicing system 210 overlaps second deicing system 212.

First deicing system 210 may be a traditional deicing system or a traditional anti-icing system. In various embodiments, first deicing system 210 may be an electrothermal ice protection system. That is, first deicing system 210 may generate and/or radiate heat in response to an electric voltage and/or current. In various embodiments, first deicing system 210 may be a hot bleed air or Piccolo system. That is, first deicing system 210 receives hot air from a hot air source and directs the hot air onto high critical zone 204. There exist other traditional and conventional deicing and anti-systems that will not be described herein. Generally, first deicing system 210 tends to consume large amounts of electricity and/or rely on bleed air from combustion engines.

Second deicing system 212, in various embodiments, may be a piezoelectric system. That is, second deicing system 212 may include a plurality of piezoelectric devices that are configured to vibrate in response to an input frequency. In various embodiments, the vibrations of the piezoelectric devices match a resonance frequency of aircraft 100 causing ice to separate from control surface 202. In various embodiments, the input frequency may be a low-frequency, such as for example, about 1 kilohertz (kHz) to about 7 kHz, and more specifically, about 2 kHz to about 6 kHz. In various embodiments, the low-frequency input may be less than about 5 kHz. In various embodiments, the input frequency may be a high-frequency, such as for example, about 20 kHz to about 50 kHz, and more specifically, about 30 kHz to about 40 kHz. In various embodiments, the high-frequency input may be greater than about 30 kHz. In various embodiments, second deicing system 212 may include a plurality of high frequency discs. In various embodiments, second deicing system 212 may include a plurality of prestressed actuators. In various embodiments, second deicing system 212 may include a plurality of ultrasonic actuators. As described herein, second deicing system 212 is configured to convert an electric signal into a vibration to crack, break up, or otherwise cause ice build up to detach from control surface 202.

Generally, second deicing system 212 are designed to consume low amounts of energy, relative to conventional systems, and not rely on bleed air from combustion engines. In various embodiments, second deicing system 212 may weigh less than conventional deicing systems. Because of this, second deicing system 212 tends to reduce electricity and/or fuel consumption.

In various embodiments, a low ice adhesion (LIA) coating may also be applied to exposed exterior portions of control surface 202 including high critical zone 204 and/or low critical zone 206. In various embodiments, the LIA coating may be a hydrophobic coating or a superhydrophobic coating, among others. In various embodiments, the LIA coating may include materials such as polystyrene, carbon nano tubes (CNT), or silica nano, among others. In various embodiments, the LIA coating helps to reduce the ice adhesion to surface and hence, provides easier deicing for first deicing system 210 and/or second deicing system 212.

Figure 3A:
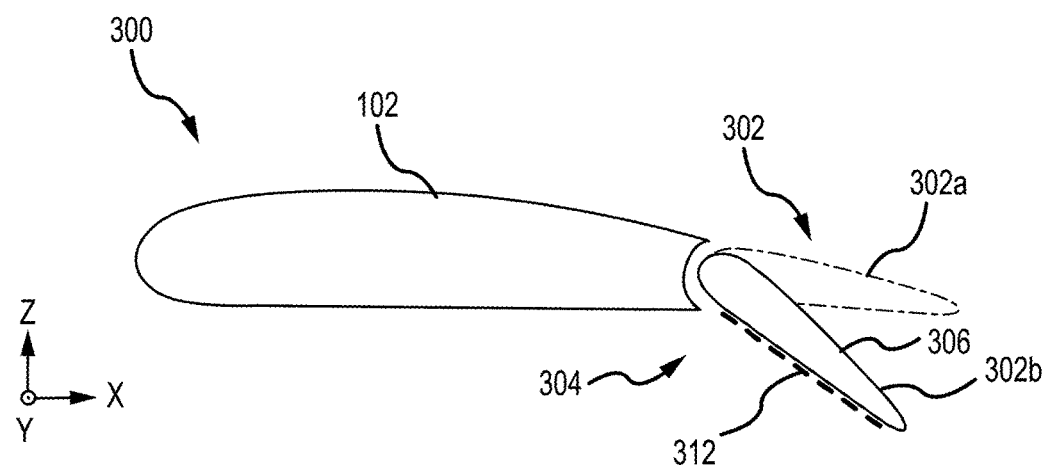
FIGS. 3A and 3B illustrate a control surface with a hybrid ice protection system, in accordance with various embodiments.
Figure 3B:
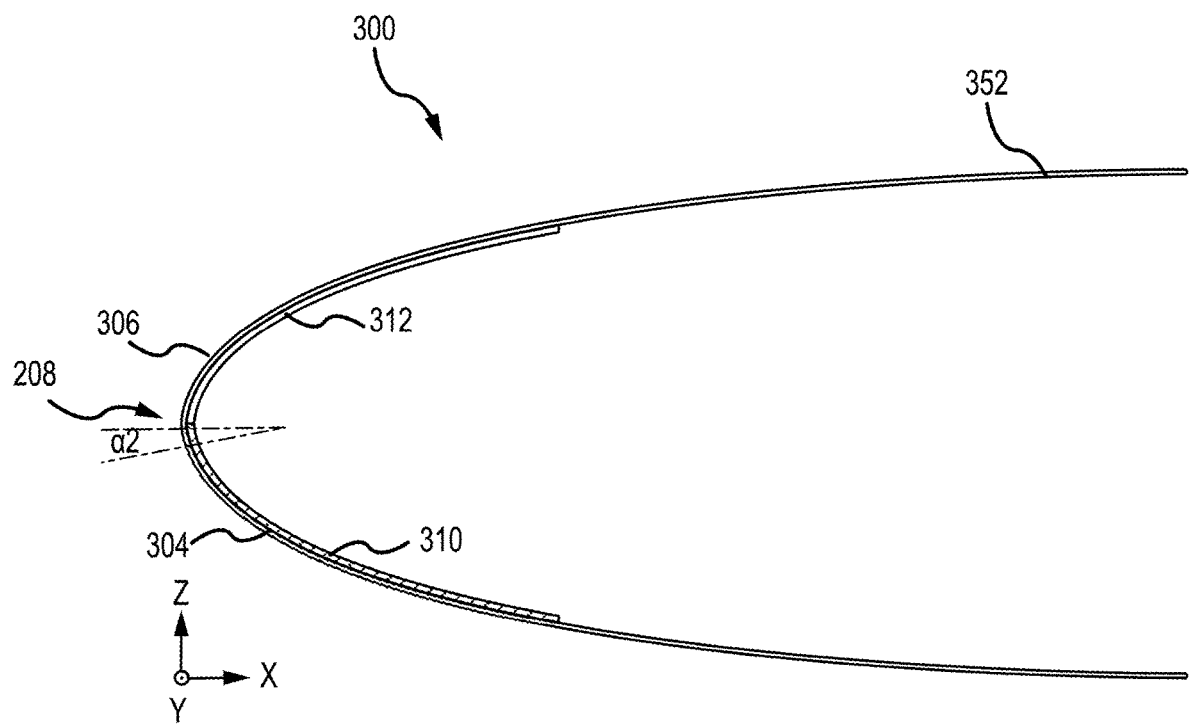

Referring now to FIGS. 3A and 3B, a hybrid deicing system 300 is illustrated for use on a control surface 302 of aircraft 100, in accordance with various embodiments. Hybrid deicing system 300 may be used with control surfaces 302 such as a plane flap, an elevator, or a horizontal stabilizer, among others. FIG. 3A illustrates a plane flap as control surface in both a raised position 302a and a lowered position 302b. Hybrid deicing system 300 includes similar components to hybrid deicing system 200 including a control surface 302, a high critical zone 304, a low critical zone 306, stagnation zone 308, a first deicing system 310, and a second deicing system 312, descriptions of which may not be repeated below. In contrast to hybrid deicing system 200, high critical zone 304 is a bottom surface of control surface 302 and low critical zone 306 is a top surface of control surface 302. Additionally, stagnation zone 208 extends from a leading edge of control surface 302 into critical zone 304 (e.g., in the negative z-direction).

Referring to FIG. 3A, typically, on plane flaps, ice does not tend to build up on the top surface, or low critical zone 306, of control surface 302. Furthermore, typically, ice protection systems are not used on control surface 302. In various embodiments, where control surface 302 is a horizontal stabilizer, conventional ice protection systems may be used. In such cases, second deicing system 312 may be used in high critical zone 304 to ensure that no ice builds up while no ice protection is used in low critical zone.

Referring now to FIG. 3B, in examples where control surface is a horizontal stabilizer, or other component, hybrid deicing system 300 may be used. First deicing system 310 is placed in high critical zone (i.e., the bottom surface of control surface 302) and second deicing system 312 is placed in low critical zone (i.e., the top surface of control surface 302). Additionally, and in various embodiments, hybrid deicing system 300 may be used together with hybrid deicing system 200. First deicing system 310 may be an example of first deicing system 210 described above in FIGS. 2A and 2B. Second deicing system 312 may be an example of second deicing system 212 described above in FIGS. 2A and 2B. In various embodiments, a low ice adhesion (LIA) coating may also be applied to exposed exterior portions of control surface 302, 352 including high critical zone 304 and/or low critical zone 306, as described above in FIGS. 2A and 2B.

Figure 4:
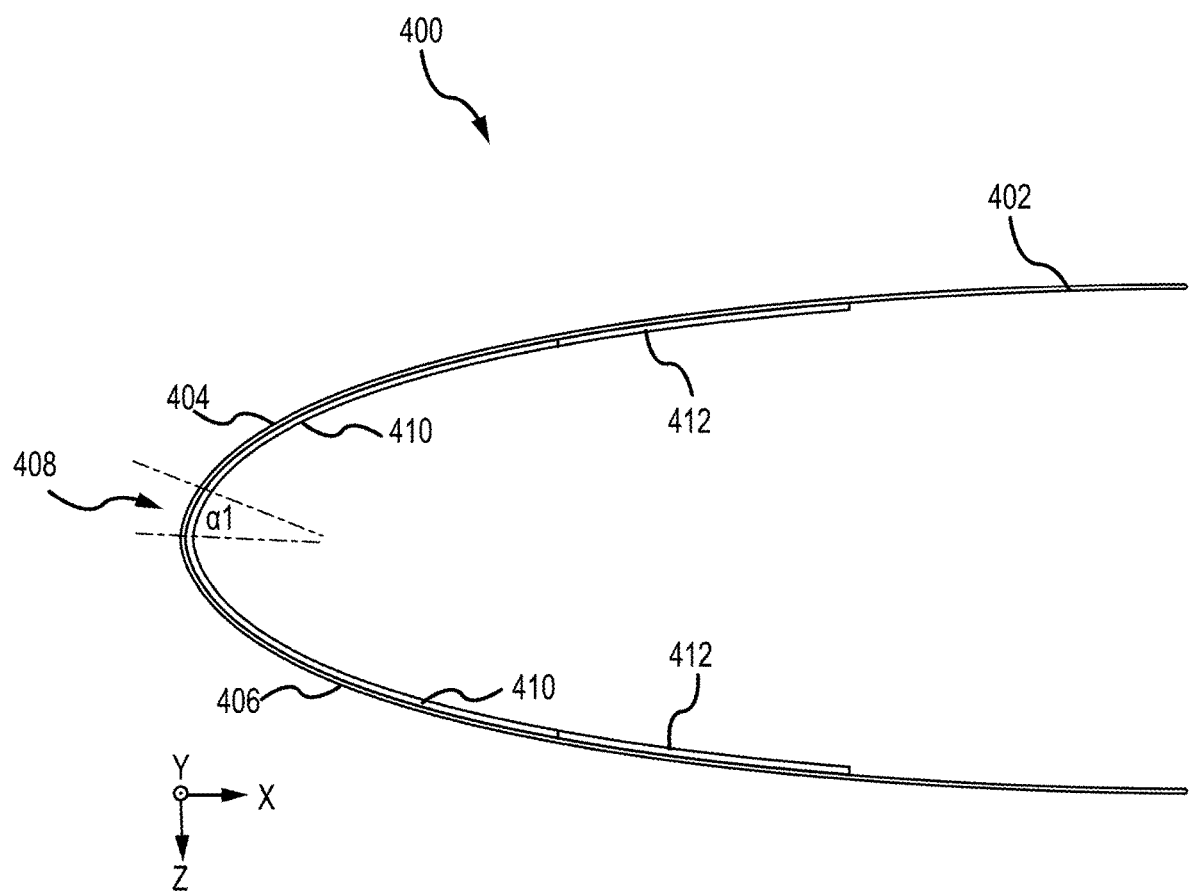
FIG. 4 illustrates a control surface with a hybrid ice protection system, in accordance with various embodiments.

Referring now to FIG. 4, a hybrid deicing system 400 for use on a control surface 402 is illustrated, in accordance with various embodiments. Hybrid deicing system 400 includes similar components to hybrid deicing system 200 including a control surface 402, a high critical zone 404, a low critical zone 406, stagnation zone 408, a first deicing system 410, and a second deicing system 412, descriptions of which may not be repeated below. In contrast to hybrid deicing system 200, hybrid deicing system 400 includes first deicing system 410 in both high critical zone 404 and low critical zone 406. Second deicing system 412 is located aft of first deicing system 410 in both high critical zone 404 and low critical zone 406. This configuration provides additional deicing protection and tends to prevent ice from reforming aft of first deicing system 410. In various embodiments, a low ice adhesion (LIA) coating may also be applied to exposed exterior portions of control surface 402 including high critical zone 404 and/or low critical zone 406, as described above in FIGS. 2A and 2B.

Figure 5:
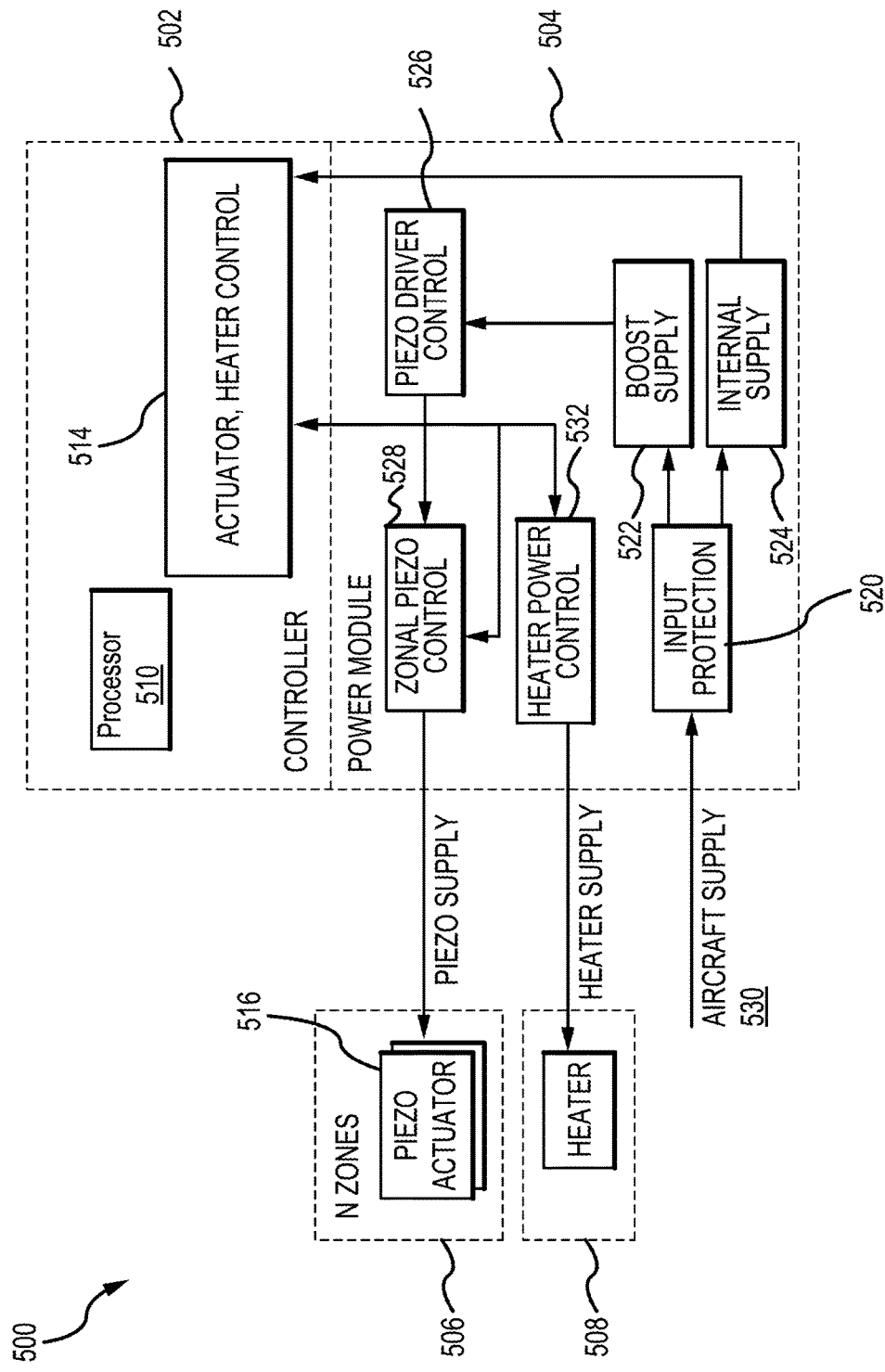
FIG. 5 illustrates a system diagram of a hybrid ice protection system, in accordance with various embodiments.

Referring now to FIG. 5, a system diagram of a piezoelectric deicing system 500 is illustrated, in accordance with various embodiments. System 500 includes a controller 502, a power module 504, a plurality of piezoelectric patch (PEP) arrays 506 arranged into zones, and a conventional deicing system 508. Controller 502 includes a processor 510 and a heater control 514. Heater control 514 provides heat for use by conventional deicing system 508. In various embodiments, convention deicing system may be an example of first deicing system 210 described in FIGS. 2A and 2B.

Power module 504 includes an input protection 520, a boost power supply 522, an internal power supply, 524, a piezo driver control 526, a zonal piezo control 528, and a heater power control 532. Heater power control 532 controls heat flow from heater control 514 to conventional deicing system 508. Input protection 520 receives a power input 530 from the aircraft (e.g., aircraft 100) and outputs a power output to boost power supply 522 and internal power supply 524. In various embodiments, power input 530 may be about 18 VDC to about 96 VDC, and more specifically, about 28 VDC. In various embodiments, power input 530 may be about 120 VAC to about 380 VAC, and more specifically, about 200 VAC to about 300 VAC. Input protection 520 protects system 500 from voltage and/or current surges from power input 530.

Internal power supply 524 provides power to the internal components of system 500 including processor 510 and heater control 514. Boost power supply 522 provides a voltage boosted power output to piezo driver control 506. Piezo driver control 526 provides power output to each of the one or more piezo actuators 516 of PEP arrays 506. More specifically, piezo driver control 526 provides power to zonal piezo control 528. Zonal piezo control 528 drives each of the one or more piezo actuators 516. Processor 510, in various embodiments, controls each heater control 514, piezo driver control 526, and zonal piezo control 528, and heater power control 532.

Processor 510 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof. Processor 510 may further comprise memory to store data, executable instructions, system program instructions, and/or controller instructions to implement the control logic of processor 510.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A hybrid deicing system, comprising:
a first deicing system coupled to a high critical zone of a control surface, the first deicing system providing thermal energy to the high critical zone of the control surface to remove ice from the control surface;
a second deicing system coupled to a low critical zone of the control surface, the second deicing system configured to vibrate the control surface to remove ice from the control surface;
a controller configured to control the first deicing system and the second deicing system;
a heater power control configured to provide heat to the first deicing system; and
a zonal piezo control configured to provide an input frequency to the second deicing system.

2. The system of claim 1, wherein the high critical zone is a top surface of the control surface.

3. The system of claim 1, wherein the low critical zone is a bottom surface of the control surface.

4. The system of claim 1, further comprising:
a piezo driver control configured to provide power to the zonal piezo control.

5. The system of claim 1, wherein the second deicing system includes a plurality of piezoelectric devices.

6. The system of claim 1, wherein the first deicing system abuts the second deicing system.

7. An aircraft, comprising:
a fuselage;
a wing coupled to the fuselage, the wing having a top surface, a bottom surface, and a leading edge between the top surface and the bottom surface; and
a hybrid deicing system coupled to the wing, the hybrid deicing system including:
a first deicing system coupled to the wing and extending from the leading edge to the top surface of the wing, the first deicing system providing thermal energy to the top surface of the wing to remove ice from the top surface of the wing;
a second deicing system coupled to the wing and extending from the leading edge to the bottom surface of the wing, the second deicing system configured to vibrate the bottom surface of the wing to remove ice from the bottom surface;
a heater power control configured to provide heat to the first deicing system; and
a zonal piezo control configured to provide an input frequency to the second deicing system.

8. The aircraft of claim 7, further comprising:
a plane flap coupled to an aft side of the wing, the aft side of the wing being opposite the leading edge, and the plane flap having a bottom surface; and
a third deicing system coupled to the bottom surface of the plane flap, the third deicing system configured to vibrate the bottom surface of the plane flap to remove ice from the plane flap.

9. The aircraft of claim 7, further comprising:
a horizontal stabilizer coupled to the fuselage, the horizontal stabilizer having a top surface and a bottom surface;
a third deicing system coupled to the bottom surface of the horizontal stabilizer, the third deicing system providing thermal energy to the bottom surface of the horizontal stabilizer to ice from the bottom surface of the horizontal stabilizer; and
a fourth deicing system coupled to the top surface of the horizontal stabilizer, the fourth deicing system configured to vibrate the top surface of the horizontal stabilizer to remove ice from the horizontal stabilizer.

10. The aircraft of claim 7, wherein the second deicing system is configured to vibrate at a high frequency of at least 20 kHz.

11. The aircraft of claim 7, further comprising:
a controller configured to control the first deicing system and the second deicing system.

12. The aircraft of claim 7, further comprising a low ice adhesion (LIA) coating applied to an exterior portion of at least one of the top surface, the bottom surface, or the leading edge.

13. The aircraft of claim 7, wherein the second deicing system includes a plurality of piezoelectric devices.

14. The aircraft of claim 7, wherein the second deicing system includes an ultrasonic actuator.

15. An aircraft, comprising:
a fuselage;
a wing coupled to the fuselage, the wing having a top surface, a bottom surface, and a leading edge between the top surface and the bottom surface; and
a hybrid deicing system coupled to the wing, the hybrid deicing system including:
a first deicing system coupled to the wing, the first deicing system providing thermal energy to the wing to remove ice from the wing;
a second deicing system coupled to the wing and adjacent the first deicing system, the second deicing system configured to vibrate the wing to remove ice from the wing;
a heater power control configured to provide heat to the first deicing system; and
a zonal piezo control configured to provide an input frequency to the second deicing system.

16. The aircraft of claim 15, wherein the first deicing system is coupled to the top surface and the bottom surface adjacent the leading edge and the second deicing system is coupled to the top surface and the bottom surface, the first deicing system disposed between the leading edge and the second deicing system.

17. The aircraft of claim 15, wherein the first deicing system is coupled to the top surface of the wing and the second deicing system is coupled to the bottom surface of the wing.

18. The aircraft of claim 15, wherein the first deicing system abuts the second deicing system.

19. The aircraft of claim 15, wherein the second deicing system includes a plurality of piezoelectric devices.

\* \* \* \* \*